United States Patent [19]

Biller et al.

[11] Patent Number: 4,679,803
[45] Date of Patent: Jul. 14, 1987

[54] APPARATUS FOR MAINTAINING STABILITY OF MOBILE LAND VEHICLES ON SLOPING TERRAIN

[75] Inventors: Cleveland J. Biller, Morgantown; David D. Johnson, Booth, both of W. Va.

[73] Assignee: The United States of America as represented by the Secretary of Agriculture, Washington, D.C.

[21] Appl. No.: 822,574

[22] Filed: Jan. 27, 1986

[51] Int. Cl.⁴ .................... B60P 1/18; B60G 17/00
[52] U.S. Cl. .................... 280/6 H; 180/41; 280/702
[58] Field of Search ........... 280/702, 111, 6 H, 775, 280/6 R; 180/41, 209; 212/156

[56] References Cited

U.S. PATENT DOCUMENTS

| | | | |
|---|---|---|---|
| 3,099,098 | 7/1963 | Davis | 37/86 |
| 3,160,284 | 12/1964 | Moore | 212/49 |
| 3,233,909 | 2/1966 | Boone | 280/6 |
| 3,393,761 | 7/1968 | Greulich | 180/209 |
| 3,430,790 | 3/1969 | Beltrami | 214/138 |
| 3,651,588 | 3/1972 | Hanson | 37/108 R |
| 3,703,298 | 11/1972 | Laverda | 280/6 H |
| 3,902,691 | 6/1975 | Ott | 246/167 R |
| 3,916,544 | 11/1975 | Swisher et al. | 37/110 |
| 3,924,704 | 12/1975 | Lindblom et al. | 180/41 |
| 4,124,226 | 11/1978 | Phillips | 280/765 |
| 4,152,004 | 5/1979 | Schroder | 280/111 |
| 4,236,591 | 12/1980 | Molby | 180/41 |
| 4,326,571 | 7/1982 | Crawford | 280/6 H |
| 4,344,497 | 8/1982 | Rathi et al. | 180/41 |
| 4,365,927 | 12/1982 | Schenck | 414/729 |

Primary Examiner—Richard A. Bertsch
Attorney, Agent, or Firm—M. Howard Silverstein; David G. McConnell

[57] ABSTRACT

The present invention relates to mobile land vehicles having a boom assembly, and more particularly to vehicles used for felling and handling trees on steep mountainous terrain. The vehicle of this invention includes apparatus for providing multi-directional relative movement between a conventional tread assembly of the caterpillar type and a swing-house assembly which includes a boom subassembly supporting tree-felling and handling equipment, so that the swing-house assembly is maintained in a substantially level relationship with the horizontal, regardless of the inclination of the ground on which the vehicle rides, and so that the center of gravity of the vehicle is optimized by weight transfer corresponding to the type of ground inclination encountered.

20 Claims, 15 Drawing Figures

APPARATUS FOR MAINTAINING STABILITY OF MOBILE LAND VEHICLES ON SLOPING TERRAIN

BACKGROUND OF THE INVENTION

The present invention relates to mobile land vehicles having a boom assembly, and more particularly to vehicles used for felling and handling trees on steep mountainous terrain. The vehicle of this invention includes apparatus for providing multidirectional relative movement between a conventional tread assembly of the caterpillar type and a swing-house assembly which includes a boom subassembly supporting tree-felling and handling equipment, so that the swing-house assembly is maintained in a substantially level relationship with the horizontal, regardless of the inclination of the ground on which the vehicle rides, and so that the center of gravity of the vehicle is optimized by weight transfer corresponding to the type of ground inclination encountered.

In the past, the operation of conventional cranes, derricks and other land vehicles having a boom assembly mounted thereon was limited by the inclination of the ground during specific operations while the vehicle was stationary, and during movement of the vehicle over changing terrain when the vehicle is in motion. The limitation and operability of these conventional vehicles is pronounced when the vehicle is inclined in various positions on sloping ground, such as on hills or mountains. As is well known, such inclination of the vehicle shifts the center of gravity away from the point of maximum load stability of the vehicle on the ground which unbalances the vehicle thus tending to cause it to overturn if some correction is not made, as for example by movement of the vehicle itself, to reduce the critical deviation of the center of gravity from this maximum load stability point. Also, as can be appreciated, shifting of the center of gravity of the maximum load stability point likewise occurs during travel of the vehicle over uneven terrain having marked differences in grade.

Among the conventional devices of the type described above are those disclosed for U.S. Pat. No. 3,160,284 to Moore; U.S. Pat. No. 4,326,571 to Crawford; and U.S. Pat. No. 3,430,790 to Beltrami.

The patent to Moore discloses a weight-stabilizing, load-handling vehicle used in forestry work which is adapted to operate on inclined surfaces wherein the vehicle includes a swinghouse assembly 6, an engine 7 and a double cab 8, all mounted on a base platform 3 which rides on caterpiller treads 2. The machine includes a mechanism for moving the cab in fore and aft directions, as well as in right and left directions by means of dual stacked slide-track assemblies (as shown in FIGS. 4, 5, 7 and 8). In another embodiment, movement of the cab is possible in these directions by use of a tilting and sliding track assembly.

In the Crawford patent, there is disclosed a vehicle adapted for operation in hilly regions which utilizes two hydraulic cylinders to move and tilt the operator's cab in right and left directions. Also disclosed is a vehicle having the capacity of tilting the cab fore and aft using hydraulic cylinders.

In the Beltrami patent, an excavator is disclosed which includes a driver's cab 19 supported by a tiltable platform arrangement 14 where the platform is adapted for tilting movement in the fore and aft, and right and left, directions by means of four hydraulic cylinders and unparallel, articulated links.

OBJECTS OF THE INVENTION

It is an object of the present invention to provide an improved apparatus for altering the effective center of gravity of a mobile land vehicle having swing-house assembly.

Another object of the invention is to provide apparatus for maintaining the cab of a land vehicle swing-house assembly substantially horizontal while the vehicle traverses sloping terrain.

Another object of the invention is to provide apparatus for shifting the swing-house assembly of a land vehicle longitudinally and/or transversely of its tread assembly while the vehicle traverses sloping terrain.

Yet another object is to provide apparatus for altering the location of the swing-house assembly of a mobile land vehicle relative to its tread assembly by a combination of any two or more pivoting, translating or rotating motions of the swing-house assembly relative to the longitudinal or transverse axes of the tread assembly.

BRIEF DESCRIPTION OF THE DRAWINGS

These and other objects of the present invention will become more apparent to persons ordinarily skilled in this art when reference is made to the following detailed description of this invention and to the accompanying drawings, in which.

DETAILED DESCRIPTION OF THE DRAWINGS

In the Figures of the drawings, like characters and numerals refer to like or corresponding parts throughout the several views, and the various embodiments of the feller-buncher vehicle according to the present invention all comprise a telescoping tread assembly TA including right and left caterpillar tracks and a supporting undercarriage, superstructure support or turntable TT including a swing motor SM for driving the turntable in rotation, an operator's cab C, a power source PS including an engine and pumps, and a boom assembly BA. The boom assembly comprises a main boom MB, a jib boom JB and a feller-buncher or shear head SH. The boom assembly is pivotably cantilevered on turntable TT from a pivot P located adjacent the lower rear of the operator's cab. Hydraulic cylinders $HC_1$, $HC_2$ and $HC_3$ extend between, and pivotably interconnect, the turntable TT with the main boom MB, the main boom MB with the jib boom JB, and the jib boom JB with the shear head SH, respectively.

Figure 1:
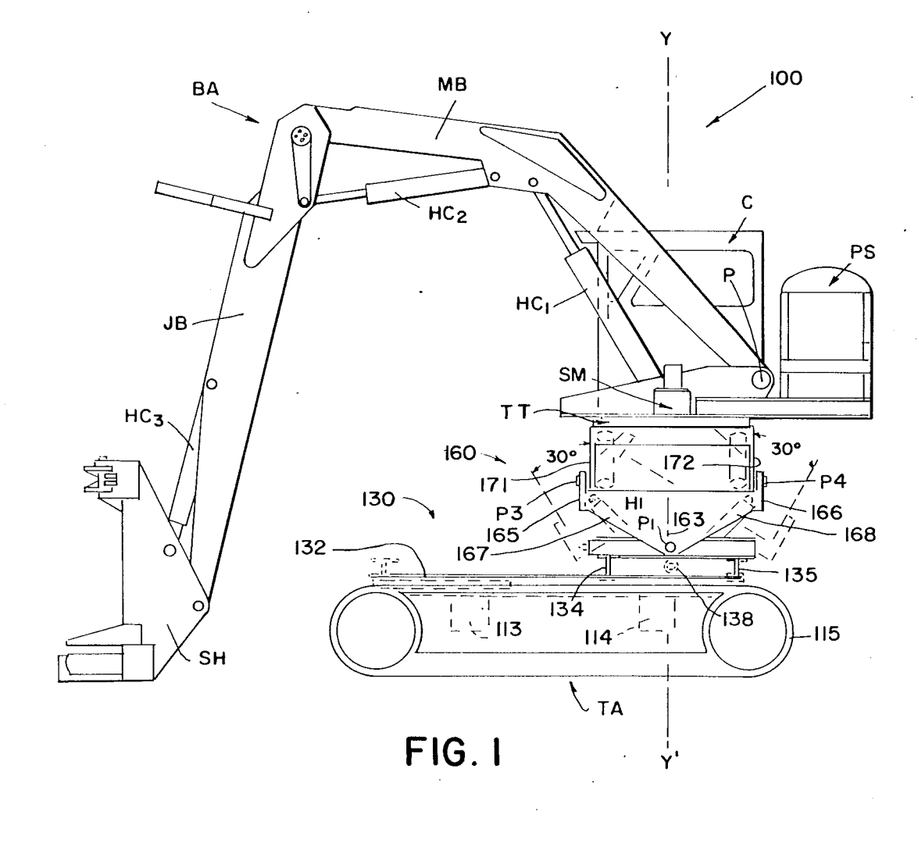
FIG. 1 is a side view of a first embodiment of the present invention.
Figure 2:
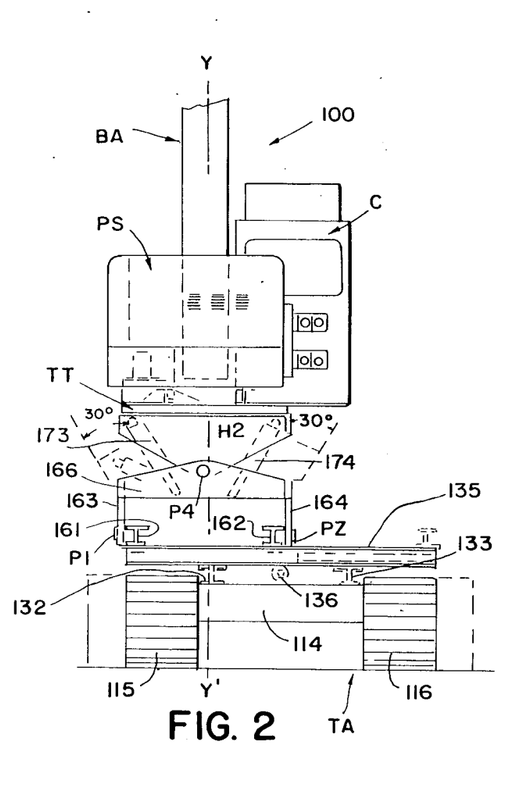
FIG. 2 is a rear view of the embodiment of FIG. 1.

Referring now to FIGS. 1 and 2, there is shown a first embodiment 100 of the invention in which telescoping tread assembly TA includes undercarriage frame cross members 113, 114 for supporting the caterpillar tracks 115, 116 as well as conventional driving apparatus, powered via suitable connections with the power source and controlled at the operator's cab via an automatic control system, for imparting the same or opposite movements to the two caterpillar tracks.

Positioned between the undercarriage cross-members 113, 114 and the turntable TT is a center-of-gravity shifting assembly which comprises a slide subassembly 130 and a tilt subassembly 160.

The slide subassembly 130 includes a first pair of elongated slide members 132, 133 extending lengthwise of, and parallel to, the caterpillar tracks 115, 116, and a second pair of slide members 134, 135 slidably mounted above, and extending substantially perpendicular to, the slide members 132, 133. Slide members 134, 135 are spaced relative to one another and fixed in their spaced relationship due to their attachment to support beams 161, 162 (described below). Undercarriage cross members 113, 114 carry slide members 132, 133 transversely thereof and laterally inwardly of the caterpillar tracks 115, 116, and all of the slide members preferably take the form of I-beams. Mounted between, and extending longitudinally of, the slide members 132, 133 is at least one hydraulic cylinder 136 secured, in a suitable manner, to one of slide members 134 or 135 and the forwardmost end of the slide members 132 and 133 for selectively driving the slide members 134, 135 over the slide members 132, 133 in forward (fore), and rearward (aft), directions parallel to the lengthwise extent of slide members 132, 133. Positioned between the slide members 134, 135 is at least one hydraulic cylinder 138 secured, in a suitable manner, between the tilt subassembly support beams 161, 162 (see FIG. 2) and the slide members 134, 135 for selectively driving the tilt subassembly over the slide members 134, 135 in lateral (right and left) directions parallel to the lengthwise extent of slide members 134, 135 and perpendicular to the lengthwise extent of slide members 132, 133.

The tilt subassembly 160 includes a pair of support beams 161, 162 which extend parallel to slide members 132, 133 and are coupled to slide members 134, 135 via the hydraulic cylinder 138, a first or lower housing member H1 having downwardly extending, opposing legs 163, 164 each positioned laterally outwardly of and adjacent to a respective support beam 161, 162. Each leg is pivotably connected to the respective support beam by a pivot P1, P2 carried at substantially the center of the length of each beam. The pivotal connection of the legs 163, 164 with the beams 161, 162 at the respective pivots P1, P2 facilitates pivoting movement of the housing member H1 about an axis extending parallel to the second pair of slide members 134, 135. Housing member H1 also includes a pair of upwardly extending legs 165, 166 located at the forward (fore) and rearward (aft) ends thereof, respectively, with the outer major surface of leg 165 facing forwardly and the outer major surface of leg 166 facing rearwardly. Hydraulic cylinders 167, 168, which are powered via power source PS and suitably controlled at the operator's cab C, are connected between the support beams 161, 162 and the upper portion of housing member H1 adjacent the lower legs for pivoting housing member H1 about the pivots P1, P2 relative to the support beams 161, 162. A second, inverted housing member H2 is provided above the first housing member H1, and includes downwardly depending opposing legs 171, 172 disposed inwardly of, and parallel to, upper legs 165, 166 of housing H1. Legs 171, 172 are pivotably connected to legs 165, 166 respectively, of housing H1 at pivots P3, P4 carried respectively by legs 165, 171 and 166, 172. Pivots P3 and P4 facilitate pivoting movement of the housing member H2, and therefore of turntable TT, in lateral directions (i.e., to the right and to the left) relative to housing member H1 and telescopic tread assembly TA. Hydraulic cylinders 173, 174, which are powered via power source PS and controlled via suitable controls located in the operator's cab C, are provided for the pivoting movement of housing member H2 in the lateral directions relative to housing member H1 and the telescoping tread assembly TA. Both sets of hydraulic cylinders are inclined at an acute angle to an axis Y-Y' extending upwardly through and centrally of the operator's cab C. As shown in both FIGS. 1 and 2, the lower housing member H1 can pivot up to about 30° from the axis Y-Y' in either of the fore or aft directions, and the upper housing H2 can pivot about the axis Y-Y' up to about 30° in either of the right, or the left, directions. Thus the turntable TT, which is seated upon, and secured to, the uppermost surface of housing H2 is pivotable into a variety of positions relative to its normally level position shown in FIGS. 1 and 2.

The first embodiment of the present invention therefore is capable of changing the center of gravity of the vehicle and maintaining the turntable TT horizontally level by both fore and aft sliding, and multidirectional pivoting, movements of the turntable TT and its supported structure relative to the telescoping track assembly TA.

As shown in FIG. 2, the caterpillar tracks 115, 116 may be telescopically extended laterally relative to the undercarriage cross members 113, 114 in order to provide a wider base upon which the loads supported by the track assembly can be distributed. The extension of the caterpillar tracks can be effected by conventional hydraulic or mechanical mechanisms, powered through suitable means by the power source PS, and controlled via suitable means from the operators cab C. The extension of the tracks is desirable because local highway width is 8 feet, but in off-highway use, for greater stability of the vehicle is achieved a width of from 10 to 12 feet.

Figure 3:
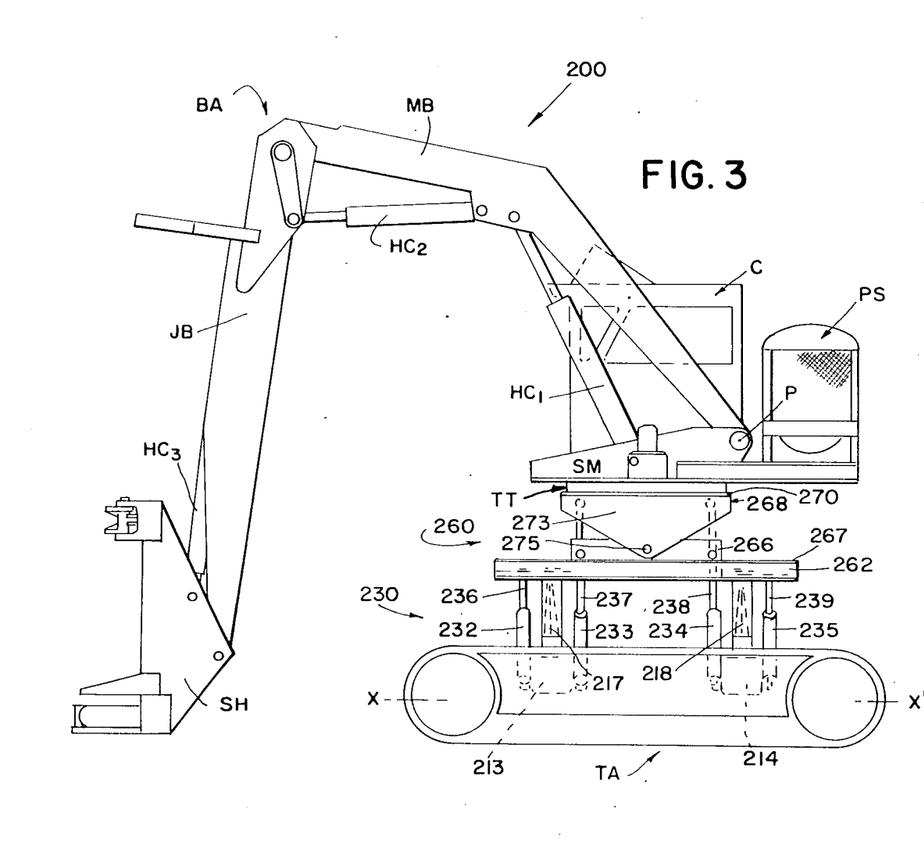
FIG. 3 is a side view of a second embodiment of the present invention.
Figure 4:
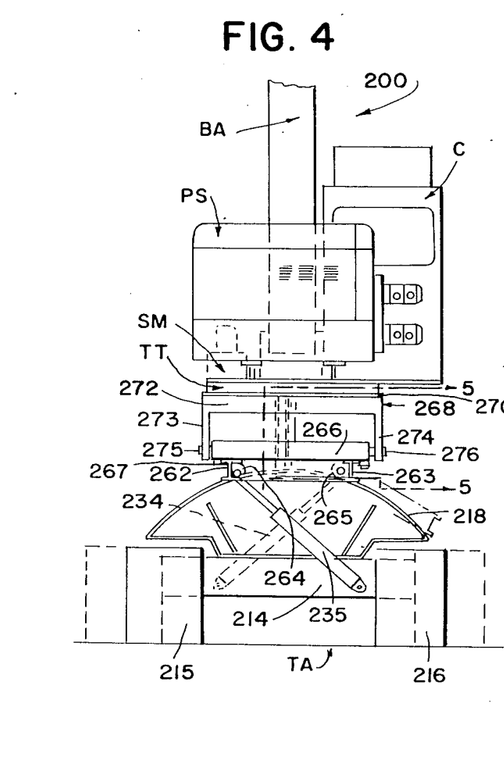
FIG. 4 is a rear view of the embodiment of FIG. 3.
Figure 5:
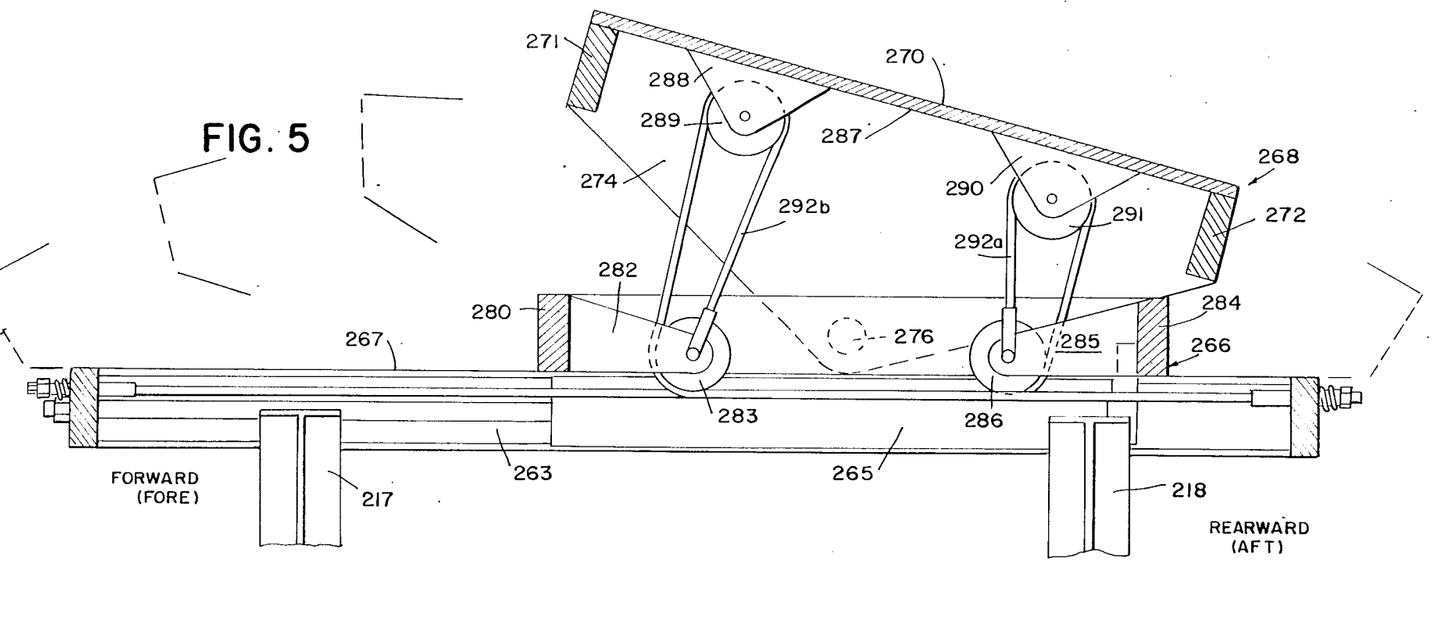
FIG. 5 is a side view, partly in section, of the embodiment of FIG. 4 taken along section lines 5—5.

FIGS. 3–5 illustrate a second embodiment 200 of the mobile land vehicle of the present invention, which includes a center of gravity adjusting assembly, disposed between and interconnecting the tread assembly undercarriage cross-members 213, 214, with the turntable TT. This embodiment includes a first slide-and-tilt subassembly 230 consisting of convex support guides 217, 218 attached to the cross members 213, 214. Subassembly 230 facilitates tilting in left and right directions of the turntable TT, relative to the tread assembly TA. A second slide-and-tilt subassembly 260 facilitates lengthwise displacement of the turntable TT relative to the tread assembly TA as well as tilting movement of turntable TT in forward and rearward directions.

The first slide-and-tilt subassembly 230 comprises a pair of arcuately shaped, convex support guides 217, 218 which are affixed to, and supported by, cross members 213, 214 respectively. Guides 217, 218 extend transversely of the tread assembly TA (for a purpose to be described below). Pivotably connected to the sides of each of the cross members 213, 214, in the vicinity of tracks 215, 216 are the lower ends of a first pair of hydraulic cylinders 232, 233 (associated with support beam 213) and a second pair of hydraulic cylinders 234, 235 (associated with support beam 214). As shown more clearly in FIG. 4, the hydraulic cylinder 235 has its lower end pivotably connected to the rear face of support beam 214 at a location adjacent the track 216 while the hydraulic cylinder 234 has a lower end pivotably connected to the forward face of support beam 214 at a lcoation adjacent to the track 215. The hydraulic cylinders extend angularly upwardly from support beam 214 generally toward one another in parallel planes, and have respectively pistons 238, 239 with upper ends pivotably connected to a pair of spaced, beam-like slide tracks 262, 263 disposed parallel to, and extending in the direction of, the longitudinal axis of telescoping tread assembly TA. Slide tracks 262, 263 are secured, in spaced relationship, to the guides 217, 218 with rollers, etc., and facilitate, along with the hydraulic cylinder/piston mechanisms, sliding of the slide tracks 272, 263 and movement of the subassembly 260 over the arcuate surface of the convex support guides 217, 218 so that the turntable TT and its supported structure can pivot about the longitudinal axis X-X' of the telescoping track assembly TA in right and left directions. Such movement is controlled by simultaneous pulling and pushing movements of each the pairs of hydraulic cylinders of the first subassembly 230 acting upon, and urging, the slide tracks 262, 263 to move them laterally of the telescoping tread assembly TA.

The slide-and-tilt subassembly 260 facilitates simultaneous rectilinear displacement and tilting movements of the turntable TT and its supported structure in the fore and aft directions relative to the telescoping tread assembly TA.

Slide tracks 262, 263 are substantially identical and comprise slender elongated members, such as I-beams, extending lengthwise of the tread assembly TA. Each slide track houses at least one hydraulic cylinder (e.g. cylinder 264 associated with track 262) and includes a lower portion or base which rests on, and slidingly engages, the upper convex surface of the support guides 217, 218.

A truck 266 (preferably of rectangular configuration) is mounted atop the upper portion 267 of the slide tracks 262, 263 for sliding movement lengthwise thereof in the forward (fore) and rearward (aft), directions. An upper housing or table 268 (also preferably of substantially rectangular configuration) includes an upper surface 270 on which turntable TT is mounted, downwardly depending fore and aft sides 271, 272, and left and right sides 273, 274. Each of the right and left sides are of triangular shape and terminate in a peak which is pivotably connected, via its respective pivot 275, 276 to the middle of the longitudinally extensive sides of truck 266. Truck 266 includes a forward side 280 having a rearwardly extending arm or bracket 282 which rotatably supports a pulley 283, and a rearward side 284 having a forwardly extending arm 285 which rotatably supports a pulley 286. The inner surface 287 of upper housing 268 includes a downwardly depending forward bracket 288 which rotatably supports a forward pulley 289 and a downwardly depending rearward bracket 290 which rotatably supports a rearward pulley 291.

To effect a simultaneous tilting and rectilinear motion of the table 268 (and therefore of turntable TT) relative to the slide tracks 262, 263, a pair of tension cables 292a, 292b are provided. As best seen in FIGS. 5, cable 292a extends from a threaded, biassed connection with the foreward (fore) end of slide 263 rearwardly to engage pulley 286, then upward to, and around, pulley, 291, and then downwardly to the pivot axis of pulley where it is secured adjacent arm 285. In a similar manner, the cable 292b extends from a threaded, biassed connection with the rearward (aft) end of slide track 263 forewardly to engage pulley 283, then upward to, and around, pulley 289, and then downwardly to the pivot axis of pulley 283 where it is secured. The connection of cable 292a to the foreward end of slide track 263 comprises a threaded fastener and a spring interposed between the fastener and the outer face of the rearward end of slide track 263. Control cable 292b is attached to the rearward end of slide track 263 in a similar manner. The interposed springs are provided for the purpose of increasing or decreasing the tension in the respective control cables in order to accommodate changes in length due to wear and geometric change.

As the truck 266 moves from the position shown in FIG. 5 in fore and aft directions along slide tracks 262, 263, the angular orientation of the turntable supporting surface 270 of table 268 changes due to the pivoted connection between table 268 and truck 266, and the interconnection between control calbes 292a, 292b and slide tracks 262, 263, so that translation of the truck 266 in a forward direction produces a concomitant counterclockwise pivoting motion of surface 270 about pivots 275, 276, and vice versa.

Translation of truck 266 along slide tracks 262, 263 is affected by a connection between the rearmost end of the hydraulic cylinders 264, 265 housed within the respective slide tracks so that movement of the cylinders forwardly or rearwardly relative to their pistons (secured to the forward end of the slide tracks) causes a corresponding rectilinear translation of the track 266 forwardly or rearwardly along the slide tracks.

As in the first embodiment described above, the distance between caterpillar tracks 215, 216 of this second embodiment may be changed from the position shown in solid lines to the position shown in dotted lines (see FIG. 4) for the purpose of enhancing stability of the vehicle.

Figure 6:
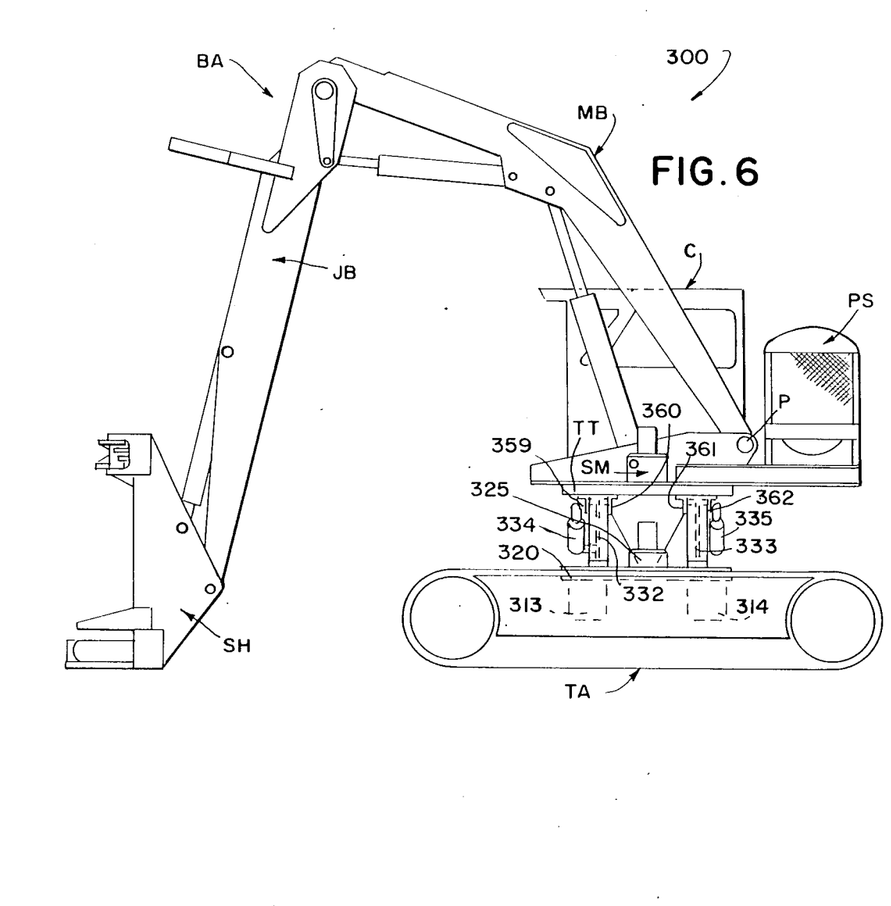
FIG. 6 is a side view of a third embodiment of the present invention.
Figure 7:
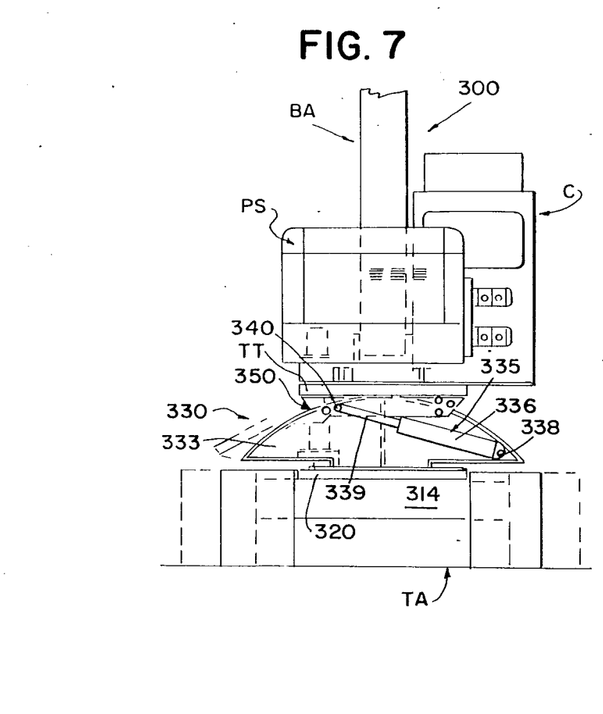
FIG. 7 is a rear view of the embodiment of FIG. 6.

Referring now to FIGS. 6 and 7, there is shown a third embodiment 300 of the vehicle of the present invention. In this embodiment, as in the previous two embodiments, a turntable TT supports as operators cab C, a power source PS and a boom assembly BA, the latter being pivotably connected to the rear of the operator's cab at pivot P. The boom assembly BA is comprised of the same elements shown in the previous two embodiments, and similarly is operated from the operator's cab C.

Mounted substantially centrally on the telscoping tread assembly TA and supported transversely of the cross members 313, 314 is a lower turntable 320.

Mounted on the lower turntable is a slide-and-tilt track subassembly 330 (see FIG. 7) which preferably includes a pair of spaced, arcuate, convexly curved slide tracks 332, 333 which extend from one lateral side of the track assembly (for example, the right side) to the other lateral side of the track assembly (for example, the left side). A pair of hydraulic assemblies 334, 335 are pivotably connected between the track subassembly 330 and a trolley 350 supported on the track subassembly 330 for sliding movement in lateral directions. Each hydraulic assembly is disposed exteriorly of a respective track, and includes a cylinder housing 336 pivotably connected to one extreme lateral region of the track subassembly 330 at pivot 338 and a piston 339 extending toward the opposite lateral side of the slide track and pivotably connected to the trolley 350 at a pivot 340.

The trolley 350 includes two pairs of guides 359, 360 and 361, 362 sandwiching between each guide pair a respective slide track 332, 333. Mounted on top, and spanning the two pairs of guides, is turntable TT on which is supported the swing-house assembly (i.e., the operator's cab, the power source, and the boom assembly.) Turntable TT includes a swing motor SM for driving turntable TT in rotation, while a swing motor 325 is supported on lower turntable 320 for driving the latter in rotation.

By suitable controls actuatable from the operator's cab, the center of gravity of the vehicle of this embodiment may be adjusted by tilting the trolley 350 and its supported structure from side to side about a vertical axis relative to the telescoping tread assembly TA, to compensate for lateral tilting of the vehicle. Moreover, by rotating the lower turntable 320, to the tilted superstructure may further be effectively positioned in any combination fore, aft, left, right, directions. The upper turntable is primarily used in the gathering of trees, etc., and may be rotated to assist in the compensation process.

As in the previous two embodiments, the tread assembly TA is capable of telescopic extension with respect to the undercarriage cross members 313, 314 to enhance stability of the vehicle, and this can be accomplished by conventional hydraulic or mechanical means also controlled from the operator's cab.

Figure 8:
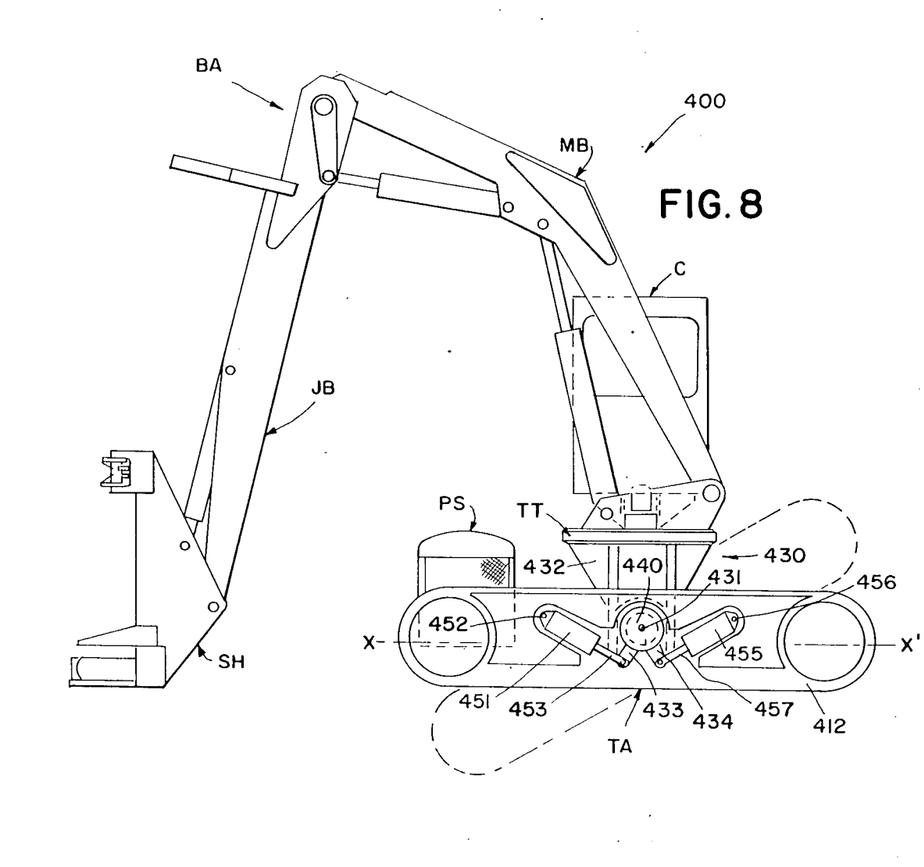
FIG. 8 is a side view of a fourth embodiment of the present invention.
Figure 9:
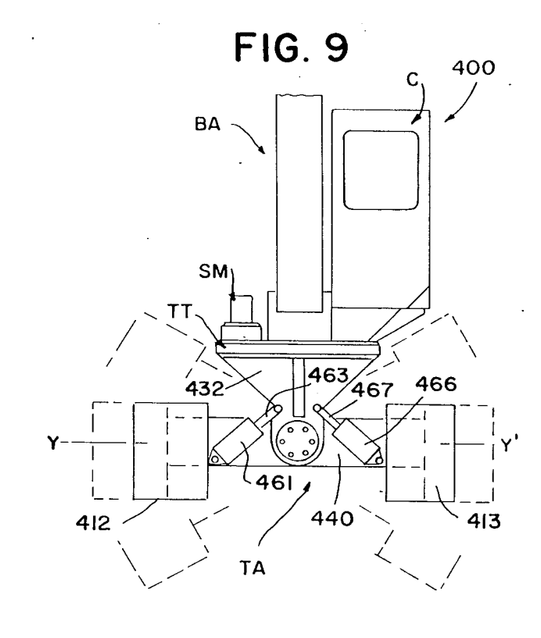
FIG. 9 is a rear view of the embodiment of FIG. 8.

Referring now to FIGS. 8 and 9, there is shown a fourth embodiment 400 of the vehicle of the present invention which includes a telescoping tread assembly TA having a pair of caterpillar tracks 412, 413, a turntable TT including a swing motor SM, a power source PS, an operator's cab C, and boom assembly BA. Interconnecting the turntable TT with the telescoping tread assembly TA is an assembly 430 for adjusting the hortizontal attitude of turntable TT, and therefore the center of gravity of the vehicle of this embodiment. The assembly 430 comprises a first support 432 having an upper end on which the turntable TT is mounted, and a lower end pivotably secured to a support 440, connecting the tracks 412, 413, about an axis extending longitudinally along the telescoping tread assembly. Support 432 is capable of pivotable movement, relative to the second support 440 both in right and left directions. These tilting movements are facilitated by the provision of hydraulic assemblies interconnecting the fore/aft tilt support 440 with the right/left tilt support 432.

FIG. 9 shows this set of tilt cylinders arranged at an oblique angle to the transverse axis Y-Y' of the tread assembly TA. Each hydraulic assembly includes a cylinder housing 461, 466 having a lower end pivotally connected to the second support 440 with an upwardly directed piston 463, 467 having an upper end pivotably secured at the mid-section of support 432. By conventional control mechanisms, extension of one piston and retraction of the other piston is accomplished simultaneously at the same speed and length of extension (or retraction), so that first support 432 may be pivoted about a pivot connection formed by the second support 440 in side-to-side transverse directions (right and left directions). This pivot could consist of tapered roller bearings, or bushings, etc. A center bolt or multiple bolts could hold yoke plates and allow for adjustment or wear.

The assembly 430 also contains a fore/aft tilt support 440, already mentioned, disposed perpendicular to the track assembly TA and placed between said track assemblies with its end pivotally held in the tread assembly TA allowing rotation of the fore/aft tilt support and corresponding fore/aft and tilting movement of the attached structures right/left tilt support 432 and turntable TT. Rotation is facilitated by the provision of hydraulic assemblies interconnecting the fore/aft tilt support and the tread assembly TA.

A first set of tilt cylinders 451 (fore), 455 (aft) as seen in FIG. 8, are arranged at an substantially acute angle to the longitudinal axis X-X' of the track 412. A second set of tilt cylinders (not shown), identical with the first set, are provided in track 413 in a similar manner. Each cylinder of the first set (and similarly in the second set) has one end 452, 456 pivotably connected to the track assembly, and is a downwardly directly piston 453, 457, extending from each cylinder and having its end, pivotably secured to downwardly depending diverging arms 433, 434 which are part of the second support 440. By conventional control mechanisms operated from the operator's cab, extension of one piston and retraction of the other piston is accomplished simultaneously, at the same speed and length of extension (or retraction), so that the second tilt support 440 may be pivoted about the pivot center 431 relative to the track assembly.

In this embodiment the two tracks 412, 413 may be locked or operated together in the same direction by the two hydraulic piston-and-cylinder assemblies to enable the second support 440 to rotate and change it's angular position relative to the tread assembly TA and thus the angle of the turntable to the ground. Alternatively, each track 412 or 413 may be individually locked or operated by the two hydraulic piston-and-cylinder assemblies to enable each track to independently rotate and change its angular position relative to the second support 440. By doing so, a track end could be lifted up to an obstacle it could not drive onto. Also contemplated is a "floating" track mode in which each track would be free to rotate about the fore/aft tilt support 440 in order to conform to changing ground slopes or to tilt to climb over obstacles. This feature would greatly improve traction and stability by allowing each track to remain substantially entirely on the ground. This could be accomplished with a hydraulic cross connection between the fore cylinders of either track with the aft cylinders of the opposite track. This cross connection would control the rotation of the second support 440 in relation to the tread assembly. Then, if one track were pivoted a certain way about it's pivot 431 the second support 440 would move half that amount in the same direction. Since the tracks firmly engage the ground, the second support pivots relative to the tracks. The vehicle is shown in this manner because the idea is to keep the cab level on uneven ground.

As in the previously described embodiments, the tracks 412, 413 maybe telescopically extended from the position shown in FIG. 9 (in solid lines) to the position shown in phantom lines so that the effective width of the tread assembly can be increased for better stability of the vehicle. This feature would be build into the second support 440 in the form of a tube within a tube which would allow extension. The tubes would be keyed to prevent rotation unless actuated by the hydraulic assemblies 451, 455.

In addition, by virture of the two sets of tilt cylinders (fore/aft, left/right), the turntable TT and its supported structure can be pivoted, moved, or tilted about respective longitudinal (X-X') and transverse (Y-Y') axes of the track assembly in both fore and aft directions as well as in right and left directions. Depending upon the power source size and location (the power source may be also be disposed on the turntable TT adjacent to the operator's cab C), the turntable TT and its supported structure may restricted from tilting in some of the directions. The pivot 431 of this embodiment could be a tube, and the second support 440, would rotate within the track assembly housing controlled by its hydraulic assembly. All other machines use an "undercarriage" or frame to which the tracks, tilt mechanism, etc., are attached. This design has a tilt mechanism member attached directly to the tracks. This allows reduction in height, cost, and parts.

Figure 10:
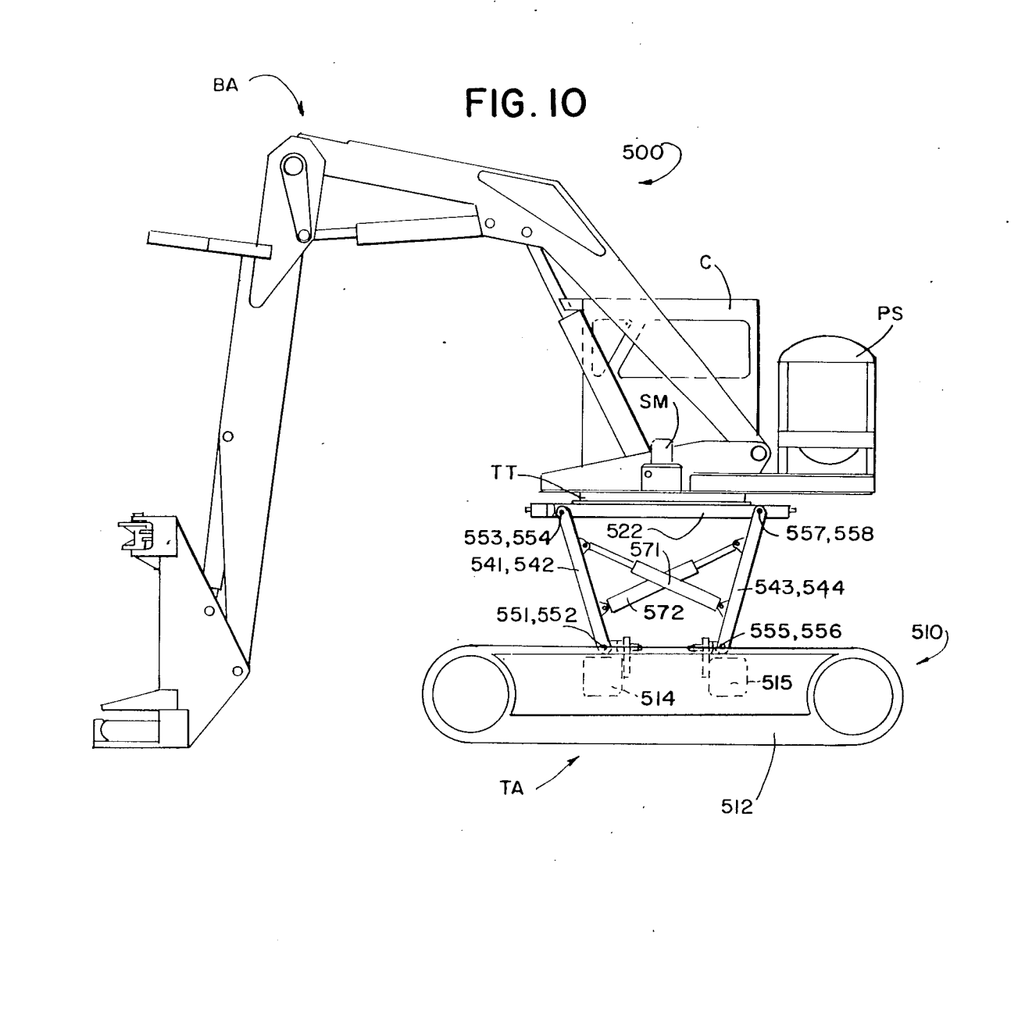
FIG. 10 is a side view of a fifth embodiment of the present invention.
Figure 11:
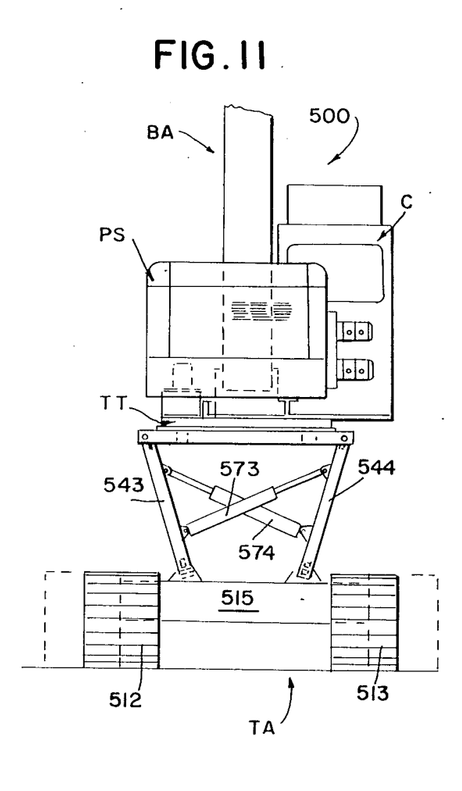
FIG. 11 is a rear view of the embodiment of FIG. 10.

Referring now to FIGS. 10–15, there is shown a fifth embodiment 500 of the vehicle of the present invention which employs four unparallel links controllable to maintain the operator's cab C and boom assembly BA level on ground slopes of up to 30° deviation from horizontal. The four unparallel links allow the operator to adjust the cab and boom assembly longitudinally or laterally, (transversely) with respect to the telescoping tread assembly TA in effect shifting the center of gravity of the vehicle, thereby making the entire vehicle stable on steep slopes. As shown in FIGS. 10 and 11, the vehicle 500 includes a rotatable turntable TT above which is supported the operator's cab C, a power source PS, a boom assembly BA and a swing motor SM for driving the turntable TT in rotation about the axis of rotation of the turntable. Tread assembly 510 supports, and includes means for driving, tracks 512, 513, which may be telescopically extended (as in the previous vehicle embodiments) to increase the effective width of the tread assembly and thereby improve the stability of the entire vehicle. A pair of undercarriage cross members 514, 515 extend transversely between the treads 512, 513 and are spaced from one another in the fore and aft directions. Disposed between, and interconnecting, the cross members 514, 515 and the turntable TT are four unparallel links and four hydraulic cylinder and piston assemblies.

Looking first at FIG. 10, links 541, 542 (link 542 is located directly behind link 541 as viewed in FIG. 10) are attached at their lower ends to cross member 514 by multidirectional swivel connections 551, 552 (these connections may be any of a variety of standard type double yokes, balls, etc.) and are attached at their upper ends to a platform 522 (on which the turntable TT is mounted) by multi-directional swivel connections 553, 554. Links 541 and 542 are inclined away from the central vertical axis of the vehicle, with the upper end of the links being located forwardly of the lower end of the links. Links 543 and 544 (link 544 being located directly behind 543) are attached in a similar fashion at their lower ends to cross member 515 by multi-directional swivel connections 555, 556 (described above) and are attached at their upper ends to platform 522 by multidirectional swivel connections 557, 558. Links 543, 544, similar to links 541, and 542, are disposed at an acute angle to a central vertical axis running through the vehicle of this embodiment, with the upper end of links 543, 544 being disposed rearwardly of the lower end of the same links. Interconnecting links 541 and 543 is a hydraulic cylinder and piston assembly, with the cylinder being pivotably attached to link 543 and the piston being pivotably attached to link 544. Similarly, a hydraulic cylinder and piston assembly interconnects link 542 and link 544, with the cylinder being pivotably attached to link 542 and the piston being pivotably attached to link 544. (The hydraulic piston and cylinder assemblies are labelled by 571 and 572 respectively). The hydraulic assemblies are disposed at an acute angle to the horizontal axis of the vehicle in the level configuration. This attachment position makes possible tilting and lateral movement when cylinder are extended or retracted.

Looking now at FIG. 11, link 543 is shown inclined from a central vertical axis of the vehicle with the upper end being located laterally outwardly (to the left hand side) of the lower end, and link 544 is shown inclined relative to a central vertical axis of the vehicle with the upper end being located laterally outwardly (to the right side) its lower end. Disposed between and pivotably interconnected with links 543 and 544 is a hydraulic cylinder and piston assembly 573 which has its piston end pivotably connected to link 544 and its cylinder end pivotably connected to link 543. Similarly, a second hydraulic piston and assembly 574 is disclosed which is interconnected pivotably between links 541 and 542 (not disclosed in FIG. 11 in as much as they are positioned behind links 543 and 544, respectively) with the piston end of cylinder and piston assembly 574 being connected to link 541 and the cylinder end of assembly 574 being connected pivotably to link 542.

Figure 12:
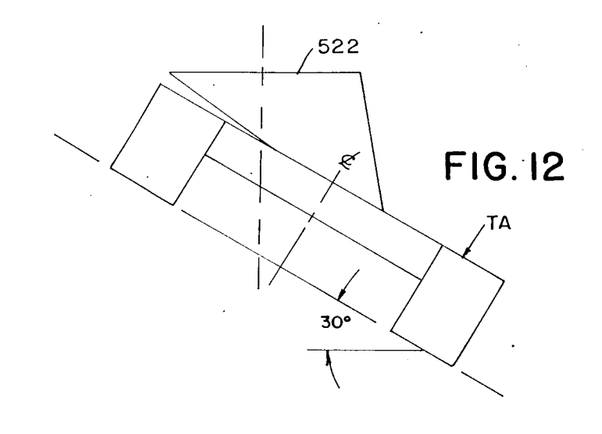
FIG. 12 is an end schematic view of the vehicle tread assembly and unparallel link assembly of FIG. 11 in a laterally inclined position.
Figure 13:
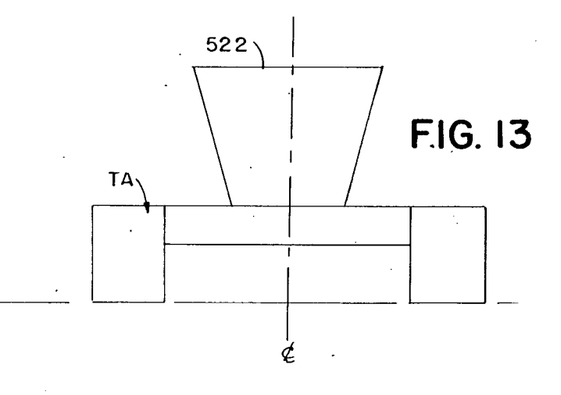
FIG. 13 is an end schematic view of the vehicle tread assembly and unparallel link assembly of FIG. 11 on level terrain.

Turning now to FIGS. 12 and 13, an end view of the vehicle and unparallel link assembly is shown schematically with FIG. 13 illustrating the link assembly positioned to support the turntable TT in a level position when the vehicle is on level ground, and FIG. 12 illustrating the vehicle seated on a slope inclined 30° to the horizontal, with the unparallel link assembly having been moved so that the platform 522 on which turntable TT is mounted is maintained in a level position. As shown in FIG. 12, the vertical center line of the track assembly is disposed at an angle of about 60° to the horizontal, and the links of the unparallel link assembly have been adjusted so that the platform 522 remains in a level position.

Figure 14:
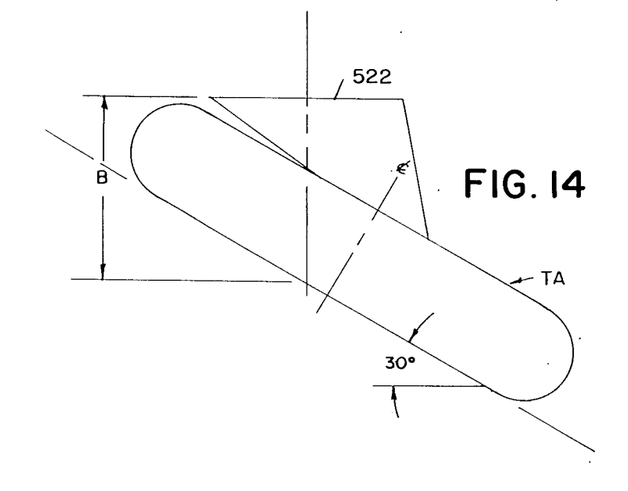
FIG. 14 is a side schematic view of the vehicle tread assembly and unparallel link assembly of FIG. 10 on inclined terrain.
Figure 15:
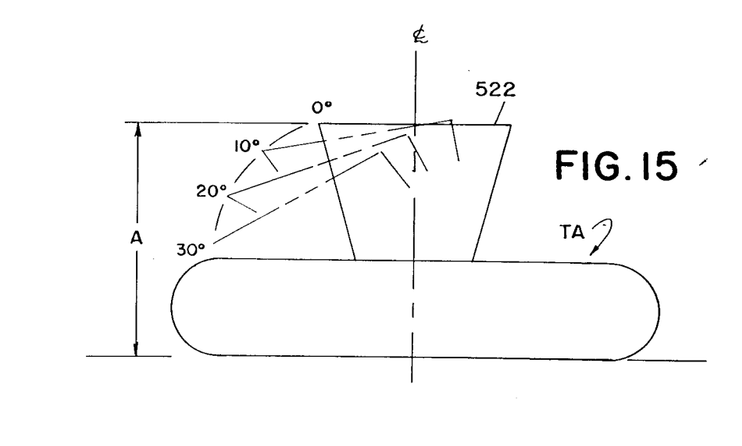
FIG. 15 is a side schematic view of the vehicle tread assembly and unparallel link assembly of FIG. 10 on level terrain.

In FIG. 14 and 15, there is shown a side view of the vehicle of this embodiment illustrating the manner in which the unparallel links may be adjusted to ensure that the platform 522 maintains its level orientation relative to the horizontal while the vehicle moves forwardly or rearwardly on a slope. In FIG. 14 the slope is shown to be about 30° relative to a horizontal plane and FIG. 15 illustrates the various link and platform relative positions as the angle of inclination increases, ranging from zero degrees to about 30°. The center line height of the platform 522 above the ground at 0° inclination of the vehicle relative to a horizontal is shown in solid lines in FIGS. 15. The center line height of platform 522, denoted by "A" (see FIG. 15) decreases denoted by "B" (see FIG. 14) as the tilt increases to thereby yield greater stability of the turntable and supported structure.

In operation, on a slope, the operator adjusts the controls to keep the platform 522 horizontally level. This in effect moves the links toward the upper side of the slope and the turntable and supported structure becomes positioned above the uphill track. On various slopes and while traversing varying slopes, the operator can adjust the tilt stability mechanisms sideways and/or from front to rear, as needed, to keep the platform horizontally level and the vehicle stable.

We claim as our invention:

1. In a vehicle including a base platform supporting a swing-house assembly for rotation about a first axis generally normal to said platform and a driver tread assembly for propelling said vehicle the swing-house assembly having an operator's cab, an engine and a boom assembly, and the tread assembly having longitduinal and transverse axes normal to said first axis, an apparatus disposed between said platform and said tread assembly for changing the center of gravity of said vehicle to stabilize the vehicle during its movement over terrain of varying slope said apparatus comprising:
   means for translating said base platform relative to said tread assembly along said longitudinal axis, and
   said translating means including means for pivoting said base platform relative to said tread assembly about said transverse axis.

2. The apparatus of claim 1 wherein said translating means also comprises means to translate said base platform along said transverse axis, and said translating means comprises first track means extending in the direction of said longitudinal axis, and second track means extending in the direction of said transverse axis, and
   said second track means being slidably supported on said first track means.

3. The apparatus of claim 2 wherein said translating means futher comprises
   first hydraulic means for sliding said second track means over said first track means, and
   second hydraulic means for sliding said second track means.

4. The apparatus of claim 3 wherein said first and second track means comprise parallel track members.

5. The apparatus of claim 1 wherein said pivoting means comprises
   a first housing pivotably coupled with said translating means and a second housing pivotably coupled with said first housing means, and said base platform being supported on said second housing.

6. The apparatus of claim 5, wherein
   said first housing has upper and lower arm portions, and said second housing has at least lower parallel arm portions,
   said first housing lower arm portions being coupled to said translating means at first pivot means, and
   said first housing upper arm portions being coupled with said second housing lower arm portions at second pivot means, each of said first and second pivot means having an axis about which pivoting occurs, and the axis of said first pivot means and the axis of said second pivot means being normal to each other as well as to said first axis.

7. The apparatus of claim 1, wherein
   said translating means comprises means for imparting substantially pure rectilinear motion to said base platform.

8. The apparatus of claim 1, wherein
   said translating means comprises means for imparting substantially pure curvilinear motion to said base platform.

9. The apparatus of claim 1 wherein
   said translating means comprises track means and trolley means engaging said track means on which said base platform is supported, and
   said pivoting means comprises said track means and powered cylinder means interconnected with, and between, both said track means and said trolley means.

10. The apparatus of claim 9 and further including means, positioned below said translating means, for rotating said translating means about said first axis so that said translating means can translate said base platform relative to said tread assembly along said transverse axis and said pivoting means can pivot said base platform relative to said tread assembly about said longitudinal axis.

11. The apparatus of claim 9, wherein said track means comprises parallel, convex tracks supported on said rotating means, said trolley means comprises roller means for engagement with said tracks.

12. The apparatus of claim 9, wherein said track means comprises parallel rectilinear tracks and said trolley means moves along said tracks with substantially pure rectilinear motion.

13. The apparatus of claim 12, and further including additional means, disposed between said track means and said tread assembly, for pivoting said base platform about said longitudinal axis.

14. The apparatus of claim 13, wherein said additional pivoting means comprises parallel, convexly arcuate tracks extending in a direction parallel to said transverse axis and powered cylinder means, pivotably coupled between said tread assembly and said rectilinear tracks, for moving said rectilinear tracks over said curvilinear tracks.

15. The apparatus of claim 12, wherein said trolley means comprises a lower portion disposed on said rectilinear tracks for motion therealong, an upper portion pivotably connected to said lower portion, and means, connecting said upper and lower trolley portions with said tracks, for pivoting said upper portion relative to said lower portion as said lower portion moves along said tracks.

16. The apparatus of claim 15, wherein
   said upper trolley portion, said lower trolley portion and said tracks each have a forward end and a rear end, and said lower trolley portion includes pivot means to which said upper trolley portion is pivotally connected,
   said pivoting means comprising means for moving said front ends of said upper and lower trolley portions toward, or away from, one another pivotally about said pivot means as said upper and lower trolley portions together move along said tracks toward, or away from, said forward end of said tracks, respectively.

17. The apparatus of claim 16, wherein
   each of said upper and lower trolley portions include first and second pulley means disposed adjacent said front and rear ends thereof, respectively, and cable means connected to, and extending between, said first pulley means and the end of said tracks opposite said first pulley means, and said second pulley means and the end of said tracks opposite said second pulley means, and further interconnecting the first pulley means of said lower trolley portion with the first pulley means of said upper trolley portion.

18. Apparatus for tilting one surface relative to another surface, comprising:

tracks means having a forward end and a rearward end, and being supported by said another surface, trolley means including a lower portion having pivot means and being movable along said track means, an upper portion pivotally connected to said lower portion at said pivot means and providing support for said first surface, said upper and lower portions each having forward and rearward ends facing the forward and rearward ends of said track means, respectively, and pulley means, carried by each of said upper and lower trolley portions at both ends thereof, and cable means, extending between, and interconnecting, said pulley means at the forward end of said upper and lower tolley portions with the rearward end of said track means, and said pulley means at the rearward end of said upper and lower trolley portions with the forward end of said track means, whereby movement of said trolley means toward or away from one end of said track means causes the same ends of said upper and lower trolley portions to pivot about said pivot means in a direction toward or away from one another, respectively.

19. In a land vehicle including a base platform supporting a swing-house assembly for rotation about a first axis generally normal to said platform, and a driven tread assembly fo propelling said vehicle, the swing-house assembly having an operators's cab, an engine and a boom assembly, and the tread assembly having longitudinal and transverse axes normal to said first axis, an apparatus for changing the center of gravity of said vehicle to stabilize the vehicle during its movement over terrain of varying slope, said apparatus comprising:

four non-parallel linkage means extending upwardly from said tread assembly to said base platform, each of said linkage means having one end pivotally connected to said tread assembly and an opposite end pivotally connected to said base platform, and powered means for moving pairs of said linkage means relative to one another.

20. The apparatus of claim 19, wherein the pivotal connections between each end of said linkage means and the base platform or the tread assembly comprise multi-directional pivots.

* * * * *